United States Patent
Kimura et al.

(10) Patent No.: US 6,434,322 B1
(45) Date of Patent: Aug. 13, 2002

(54) REPRODUCING METHOD AND APPARATUS, FOR A VIDEO SIGNAL HAVING COPY CONTROL INFORMATION

(75) Inventors: Hiroyuki Kimura, Hiratsuka; Takao Arai, Yokohama; Toshifumi Takeuchi, Ota-ku, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/148,325

(22) Filed: Sep. 4, 1998

(30) Foreign Application Priority Data

Sep. 17, 1997 (JP) .............................................. 9-251664

(51) Int. Cl.⁷ .......................... H04N 5/91; H04N 7/167; G11B 15/04; G11B 19/04

(52) U.S. Cl. ............................. 386/94; 360/60; 380/201

(58) Field of Search .............................. 386/1, 94, 45, 386/125–126; 360/60; 375/200; 380/201, 203; 382/100, 232

(56) References Cited

U.S. PATENT DOCUMENTS

| | | | |
|---|---|---|---|
| 5,530,759 A | 6/1996 | Braudaway et al. | |
| 5,561,724 A | 10/1996 | Kido et al. | |
| 5,568,570 A | 10/1996 | Rabbani ..................... 382/238 |
| 5,606,609 A | 2/1997 | Houser et al. | |
| 5,636,292 A | 6/1997 | Rhoads | |
| 5,721,788 A | 2/1998 | Powell et al. ................ 382/100 |
| 5,737,417 A | 4/1998 | Burnak et al. | |
| 5,748,763 A | 5/1998 | Rhoads | |
| 5,778,064 A * | 7/1998 | Kori et al. ...................... 380/5 |
| 5,822,425 A | 10/1998 | Ezaki et al. | |
| 5,848,155 A | 12/1998 | Cox ............................ 380/34 |
| 5,859,920 A | 1/1999 | Daly .......................... 382/115 |
| 5,889,868 A | 3/1999 | Moskowitz et al. ........... 380/51 |
| 5,896,454 A * | 4/1999 | Cookson et al. ................ 380/5 |
| 5,905,819 A | 5/1999 | Daly .......................... 382/284 |
| 5,915,027 A * | 6/1999 | Cox et al. ...................... 380/54 |
| 5,960,081 A | 9/1999 | Vynne et al. .................. 380/10 |
| 6,005,643 A | 12/1999 | Morimoto et al. ........... 380/201 |
| 6,069,914 A * | 5/2000 | Cox ............................ 375/150 |
| 6,104,826 A * | 8/2000 | Nakagawa et al. ......... 382/100 |
| 6,212,325 B1 * | 4/2001 | Kori ............................. 386/1 |
| 6,240,121 B1 * | 5/2001 | Senoh ........................ 375/130 |

FOREIGN PATENT DOCUMENTS

| | | |
|---|---|---|
| EP | 0581317 | 2/1994 |
| EP | 0612054 | 8/1994 |
| EP | 0651554 | 5/1995 |

(List continued on next page.)

OTHER PUBLICATIONS

Nikkie Electronics, No. 683, pp. 99–107, 1997.
Bender et al, Techniques for Data Hiding, IBM Systems Journal, vol. 35, Nos. 3 & 4, 1996, pp. 313–335.
"Data Hiding Technology for Supporting Electronic Water Mark (Upper)", pp. 149–162, Nikkei Electronics 1997.2.24 (No. 683), By Nikkei Business Pub., Inc.
Pixel Block Coding for Digital Still Images, by S. Shimizu, et al, pp. 257–262.

(List continued on next page.)

*Primary Examiner*—Andrew B. Christensen
*Assistant Examiner*—Polin Chieu
(74) *Attorney, Agent, or Firm*—Antonelli, Terry, Stout & Kraus, LLP

(57) ABSTRACT

Electronic watermark information obtained by changing a luminance value of a luminance signal in a video signal and a copy generation management signal (CGMS signal) inserted into an area out of a scan region of the video signal are recorded into a recording medium. A reproducing apparatus comprises an electronic watermark information detecting circuit, a CGMS signal detecting circuit, a control circuit to which detected electronic watermark information and CGMS signal are supplied, and a video signal processing circuit controlled by an output of the control circuit. When the electronic watermark information and the CGMS signal have a rational relation, the video signal processing circuit is controlled to output the video signal.

31 Claims, 6 Drawing Sheets

FOREIGN PATENT DOCUMENTS

| | | | |
|---|---|---|---|
| EP | 0766466 | | 4/1997 |
| EP | 805600 | | 11/1997 |
| EP | 840513 | | 5/1998 |
| JP | 66329 | | 1/1994 |
| JP | 8161483 | | 6/1996 |
| JP | 9130766 | | 5/1997 |
| JP | 9238031 A2 | | 9/1997 |
| WO | 9520291 | | 7/1995 |
| WO | 96/25005 | * | 8/1996 |
| WO | 9625005 | | 8/1996 |
| WO | 9636163 | | 11/1996 |
| WO | 9641468 | | 12/1996 |
| WO | 9714249 | | 4/1997 |
| WO | 9827510 | | 6/1998 |

OTHER PUBLICATIONS

W. Bender, et al., Techniques for Data Hiding, IBM Systems Journal, vol. 35, Nos. 3&4, 1996, pp. 313–335.

Papers of IEICE of Japan, D–II vol. J79–D–II, No. 8, pp. 1347–1353.

Nikkei Electronics 1997.2.24 (683) pp. 99–107 "Digital Watermark protects multi–media age".

W. Pennebake et al, "Still Image Data Compression Standard" JPEG, pp. 335–353.

Bors and Pitas: "Image Watermarking using DCT Domain Constraints" Processing of 3rd IEEE International Conference on Image Processing, Sep. 16–19, 1996, pp. 231–234, XP002095507, New York, NY US.

* cited by examiner

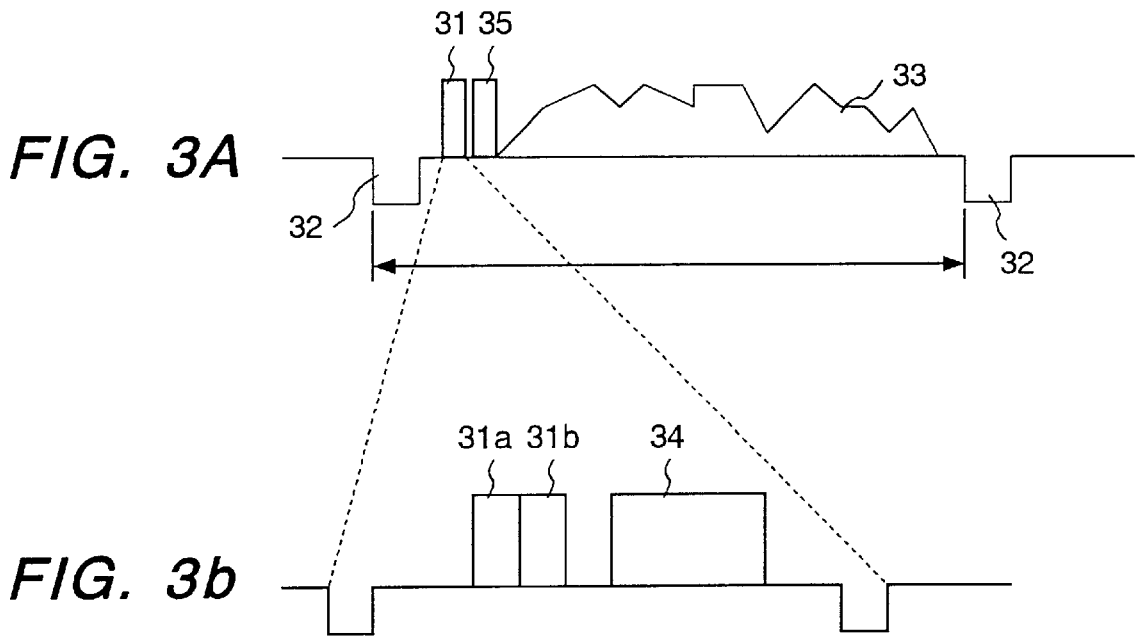
FIG. 3A
FIG. 3b
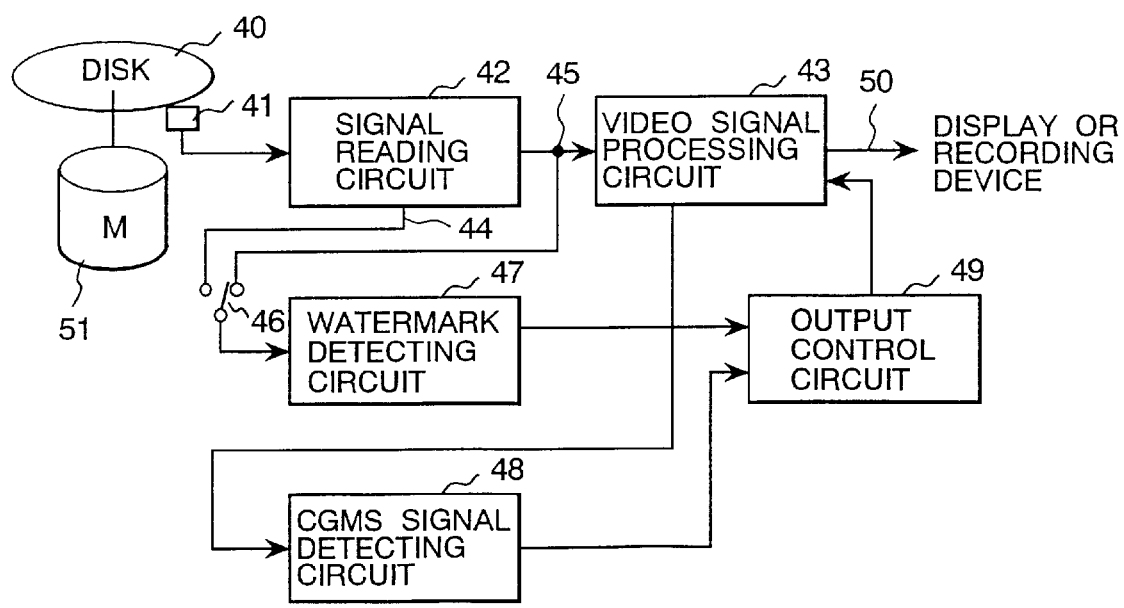
FIG. 4

REPRODUCING METHOD AND APPARATUS, FOR A VIDEO SIGNAL HAVING COPY CONTROL INFORMATION

BACKGROUND OF THE INVENTION

1. Field of the Invention

The present invention relates to recording and reproducing method and apparatus, processing apparatus, and recording medium for a video signal having copy control information including another information, that is, electronic watermark information and a copy generation management signal multiplexed or embedded on/in image data, especially, a video signal in order to control reproduction or recording of an original image or to clarify the source of the image.

2. Description of the Prior Art

Among the several methods for embedding electronic watermark (data hidden or embedded) information in a video signal, representative one is described in "Data Hiding Technique" in ITE Technical Report, Vol. 21, No. 31, pp. 3–8. Another conventional information embedding technique is described in Nikkei Electronics, No. 683, pp. 99–107, 1997. It is described that, in these conventional techniques, information different from that of an inherent video signal is embedded in a part of the video signal by using statistical characteristics of an image and a control signal showing the source of the inherent image and further determining whether the signal can be reproduced or not by using the embedded information upon reproduction is generated. In the conventional technique, information different from that of an inherent image is embedded in a part of the image by using statistical characteristics of the image and a control signal showing the source of the inherent image and further determining whether the signal can be reproduced or not by using the embedded information upon reproduction is generated.

Generally widely recognized copy control is carried out by "full copy inhibition" or "copy only once permission". The latter is positioned as a copy generation management system (CGMS). In case of permitting copy only once, the signal is rewritten upon copy operation from "copy once permission" to "copy inhibition".

The foregoing literatures, however, do not describe that copy control is performed by a combination of such a technique and electronic watermark information.

SUMMARY OF THE INVENTION

It is an object of the invention to provide recording and reproducing method and apparatus, processing apparatus, and recording medium for a video signal having copy control information, which can easily discriminate whether the signal is reproducible or not.

Another object of the invention is to provide recording and reproducing method and apparatus, processing apparatus, and recording medium for a video signal having copy control information such as electronic watermark information, copy generation management signal, and the like.

Further another object of the invention is to provide reproducing method and apparatus and processing apparatus for a video signal having copy control information, which can inhibit outputting of a reproduced signal when the copy control information is illegally operated.

Further another object of the invention is to provide reproducing method and apparatus and processing apparatus for a video signal which can perform copy control in consideration of copy generation management system by using copy control information included in a luminance signal of a video signal which is once recorded to VCR, video disk, or the like.

In a recording medium of the invention, a video signal, electronic watermark information which is embedded in the video signal and has copy control information, and a CGMS signal for copy control inserted into the video signal are recorded. The electronic watermark information can be obtained by changing a luminance value of a luminance signal in a predetermined position of a video signal. Preferably, a range of changing the luminance value of the luminance signal is set to a permissible alteration range. The CGMS signal is inserted into a region outside of a scan region of the video signal. Preferably, the CGMS signal is inserted into a region out of the scan region near a horizontal sync signal. Preferably, the CGMS signal is a signal of two or larger bits. The electronic watermark information has information of either copy free, copy-once-permission, or copy inhibition. The CGMS signal has information of either copy free, copy-once-permission, or copy inhibition.

A recording method according to the invention comprises: a step of forming electronic watermark information by embedding copy control information into the luminance signal by changing a luminance value in a predetermined position of the luminance signal; and a step of inserting a CGMS signal having copy control information into a region out of a scan region of the video signal.

A recording method according to the invention comprises: a step of calculating a visually durable range even when a luminance value of a luminance signal included in a video signal is changed; a step of generating electronic watermark information having copy control information by changing the luminance value of a luminance signal in a predetermined position within the calculated range; and a step of generating a CGMS signal which has copy control information and is inserted into a region out of a scan region of the video signal.

A recording method according to the invention comprises: a step of calculating a visually durable range even when a luminance value of a luminance signal included in a video signal is changed; a step of generating electronic watermark information having copy control information by changing the luminance value when the luminance value to be changed of the luminance signal in a predetermined position lies within the calculated range; and a step of generating a CGMS signal which has copy control information and is inserted into a region out of a scan region of the video signal.

A reproducing method according to the invention for reproducing electronic watermark information and a CGMS signal from a video signal including the electronic watermark information in which copy control information is embedded by changing a luminance value of a luminance signal and the CGMS signal having copy control information inserted into a region out of a scan region of the video signal from a recording medium and for controlling outputting of the video signal, the method comprises: a step of detecting the electronic watermark information; a step of detecting the CGMS signal; and a step of stopping the outputting of the video signal when the copy control information obtained from the electronic watermark information and the copy control information obtained from the CGMS signal lacks in rationality. Each of the electronic watermark signal and the CGMS signal has either copy inhibition information or copy-once permission information. Further, the method comprises a step of outputting and displaying the video signal by the copy-once permission information obtained from the electronic watermark information and the copy inhibition information obtained from the CGMS signal. The method further comprises a step of outputting and displaying the video signal by copy inhibition information obtained from the electronic watermark information and copy inhibition information obtained from the CGMS signal. The method further comprises a step of stopping the outputting of the video signal when the CGMS signal is not reproduced.

A reproducing method of the invention comprises: a step of discriminating the kind of a disk; and a step of stopping outputting of the video signal when the copy control information obtained from the electronic watermark information, the copy control information obtained from the CGMS signal, and the disk kind information lacks in rationality. The method further comprises a step of outputting the video signal when the disk is read only disk, the electronic watermark information is a copy-once-permitted signal, and the CGMS signal is a recording-once-permitted signal. The method further comprises a step of stopping the outputting of the video signal when the disk is a recordable disk, the electronic watermark information is a copy-once-permitted signal, and the CGMS signal is a recording-once-permitted signal.

A reproduction method of the invention for reproducing electronic watermark information and a CGMS signal from a video signal including the electronic watermark information in which either copy inhibition or copy-once-permission is embedded by changing a luminance value of a luminance signal and the CGMS signal having information of either copy inhibition or copy-once-permission from a recording medium in order to control recording of the video signal, comprises: a step of detecting copy control information embedded in the electronic watermark information; a step of detecting the copy control information from the CGMS signal; a step of discriminating whether the copy information embedded in the electronic watermark information and that in the CGMS signal has a rational relation or not; and a step of permitting recording of the video signal only when the relation is rational. The step of discriminating the rational relation discriminates the relation as rational from a state where the copy-once-permission information obtained from the electronic watermark information and the copy-once-permission information obtained from the CGMS signal is rewritten to copy inhibition information. It is discriminated as rational from a state where the copy-once-permission information obtained from the electronic watermark information is rewritten to copy inhibition and copy-once-permission information obtained from the CGMS signal is rewritten to copy inhibition information.

A recording apparatus according to the invention comprises: a permissible alteration range calculating circuit for calculating an alternation range of a luminance value of a luminance signal included in a video signal in accordance with the luminance value; an information embedment processing circuit for embedding electronic watermark information having copy control information by changing the luminance value of the luminance signal in a predetermined position within the calculated permissible alternation range; a generating circuit for generating a CGMS signal having copy control information; and an adding circuit for adding the CGMS signal to a region out of a scan region range of the luminance signal in which the electronic watermark information is embedded.

A recording apparatus according to the invention comprises: a permissible alteration range calculating circuit for calculating an alternation range of a luminance value of a luminance signal included in a video signal in accordance with the luminance value; an information embedment processing circuit for embedding electronic watermark information having copy control information by changing the luminance value of the luminance signal when the luminance value of the luminance signal in a predetermined position is within the calculated permissible alternation range; a generating circuit for generating a CGMS signal having copy control information; and an adding circuit for adding the CGMS signal to a region out of a scan region range of the luminance signal in which the electronic watermark information is embedded.

An apparatus for processing a video signal having copy control information according to the invention for reproducing electronic watermark information and a CGMS signal from a video signal including the electronic watermark information in which copy control information is embedded by changing a luminance value of a luminance signal and the CGMS signal having copy control information inserted into a region out of a scan region of the video signal from a recording medium in order to control outputting of the video signal, comprises: a circuit for processing the video signal reproduced from the recording medium; an electronic watermark detecting circuit; a CGMS signal detecting circuit for detecting the CGMS signal; and an output control circuit for controlling the video signal processing circuit from the detected electronic watermark information and the detected CGMS signal. The output control circuit controls the video signal processing circuit so as to output a video signal by copy-once-permission information obtained from the electronic watermark information and copy inhibition information obtained from the CGMS signal. The output control circuit controls the video signal processing circuit so as to output the video signal by copy inhibition information obtained from the electronic watermark information and copy inhibition information obtained from the CGMS signal. The output control circuit controls the video signal processing circuit so as not to output the video signal when the CGMS signal is not detected. When the recording medium is a recordable medium, the output control circuit controls the video signal processing circuit so as not to output the video signal by copy-once-permission information obtained from the electronic watermark information and copy-once-permission information obtained from the CGMS signal. When the recording medium is a read only medium, the output control circuit controls the video signal processing circuit so as to output the video signal by copy-once-permission information obtained from the electronic watermark information and copy-once-permission information obtained from the CGMS signal. The processing apparatus has a circuit for discriminating the kind of a disk. When an output of the disk kind discriminating circuit is a signal indicative of a recordable disk, the output control circuit controls the video signal processing circuit so as not to output the video signal by copy-once-permission information obtained from the electronic watermark information and copy-once-permission information obtained from the CGMS signal. When an output of the disk kind discriminating circuit is a signal indicative of a read only disk, the output control circuit controls the video signal processing circuit so as to output the video signal by copy-once-permission information obtained from the electronic watermark information and copy-once-permission information obtained from the CGMS signal.

A processing apparatus according to the invention comprises a circuit for updating the generation of the CGMS signal; and a rewriting and controlling circuit which controls outputting of a video signal and controls whether the video signal can be outputted or not by the electronic watermark signal and the CGMS signal. The rewriting and controlling circuit outputs the video signal from the rewriting and controlling circuit by copy-once-permission information derived from the electronic watermark information and copy-once-permission information derived from the CGMS signal, and rewrites copy-once-permission information of the CGMS signal to copy inhibition information. Or the rewriting and controlling circuit outputs the video signal from the rewriting and controlling circuit by copy-once-permission information derived from the electronic watermark information and copy-once-permission information derived from the CGMS signal, and rewrites copy-once-permission information obtained from the electronic watermark information to copy inhibition and copy-once-permission information derived from the CGMS signal to copy inhibition information.

A recording and reproducing apparatus according to the invention compares: a recording device for recording a video signal having copy control information including a bit for copy control and electronic watermark information in which a control signal generated by the bit is embedded, and a reproducing device including a detector for detecting the bit when the video signal is reproduced and a signal derived from electronic water mark for comparing the bit and the signal o obtained from electronic water mark for outputting video signal when they have a predetermined relation. only when the electronic watermark information is detected and the signal by the directly detected bit indicates one generation copy permission, the signal generated by the bit generating means is changed, the changed signal, inputted electronic watermark recording signal and video signal are simultaneously recorded, and the recording operation after that is inhibited. The bit is rewritten to a signal indicative of inhibition only when the bit shows copy one generation permission and is recorded simultaneously with the electronic watermark recording signal and video signal.

A reproducing apparatus according to the invention for reproducing a video signal from a disk on which a video signal in which electronic watermark information is recorded and a bit for copy control is written, comprises: electronic watermark information detecting means; means for detecting a signal recorded by a bit generating means; disk discriminating means for discriminating the disk; and means for reproducing the video signal written in the disk when the disk is discriminated as a read only disk by the disk discriminating means and the electronic watermark information and the bit information coincide with each other. When it is discriminated by the disk discriminating means that the disk is recordable and reproducible and the electronic watermark information coincides with bit information and when one generation copy permission of a signal generated by bit information generating means is correctly changed, the video signal is reproduced. In the case where the disk is recordable and reproducible, the video signal is reproduced only when the electronic watermark information is one generation copy permission information and information of the bit generating means is copy inhibition information.

These and other objects, features and advantages of the invention will be apparent from the following more particular description of preferred embodiments of the invention, as illustrated in the accompanying drawings.

BRIEF DESCRIPTION OF THE DRAWINGS

FIGS. 3A and 3B are schematic diagrams showing an embodiment of a television signal to which a CGMS signal is added;

FIG. 4 is a block diagram showing an embodiment of a processing apparatus of a video signal having copy control information according to the invention;

DESCRIPTION OF THE PREFERRED EMBODIMENTS

An embodiment of a electronic watermark information recording apparatus according to the invention will be described hereinbelow.

Figure 1:
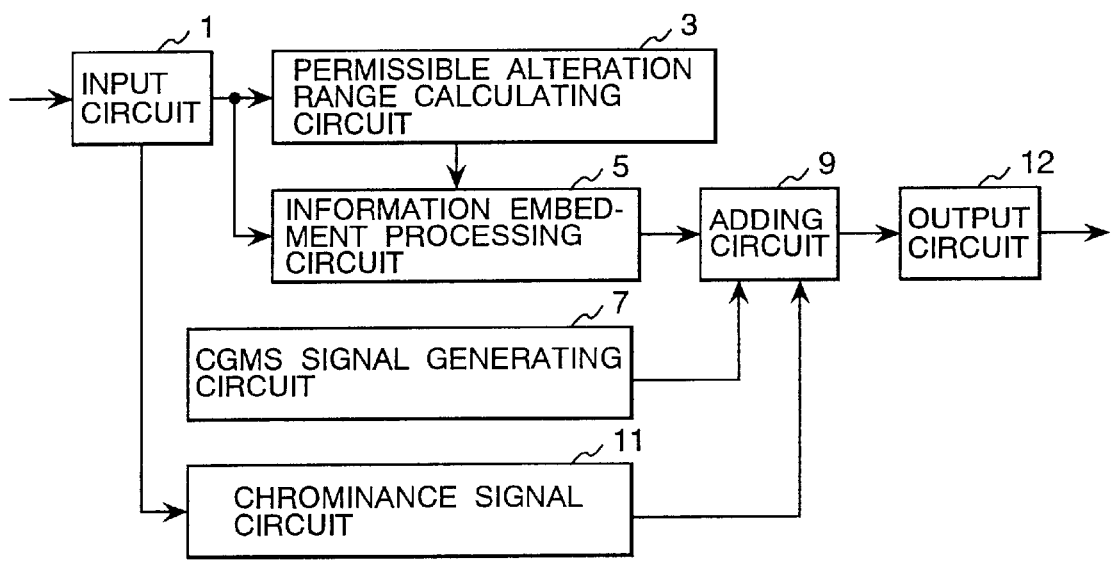
FIG. 1 is a block diagram showing an embodiment of a copy control information recording apparatus according to the invention.

FIG. 1 is a block diagram showing an embodiment of the electronic watermark information recording apparatus according to the invention. In the embodiment, the luminance of a pixel is changed, thereby embedding electronic watermark information.

In FIG. 1, a video signal is inputted to an input circuit 1. A luminance signal is picked up from the input circuit 1 and is supplied to a permissible alteration range calculating circuit 3. The range in which a visual influence is little even if the luminance signal is changed is calculated based on the luminance signal. When the luminance signal is largely changed in a part where the luminance change is large, the image is not visually changed so much. In a part where the luminance change is small, however, if a change amount of the luminance is not small, the change is visually conspicuous. The permissible alteration range calculating circuit 3 therefore calculates a permissible alteration range in consideration of the above. The calculating circuit 3 can be realized by a CPU of a computer. The calculation result from the calculating circuit 3 is supplied to an information embedment processing circuit 5. When the signal is within the permissible alteration range, a process for embedding electronic watermark information into the luminance signal by changing the luminance of a video signal is performed. The video signal in which the electronic watermark information is embedded by changing the luminance signal is stored in a memory of the information embedment processing circuit 5 until a process of one picture plane is finished. After that, the video signal is outputted. In the circuit, the calculating process in the permissible alteration change calculating circuit 3 is executed as follows.

(1) In a part where a change in an edge of an image is large, even if the amplitude of an edge signal is largely changed, the image is not visually changed so much. On the contrary, in a part where the change in an edge of an image is small, if the amplitude of the edge signal is largely changed, the image largely changes visually.

(2) An image is changed within a range where the image is not visually changed or a range where even if the image is visually changed, the change does not disturb audience.

As mentioned above, when the electronic watermark information is embedded, although the luminance is different from that of the original image, an image which is not visually different from the original image can be obtained. The permissible alteration range calculating circuit 3 stores the luminance before and after application of an image process every pixel, confirms whether the luminance is within the permissible alteration range or not, and allows the luminance signal to be changed only when the luminance is within the range.

The information embedment processing circuit 5 selects a pixel whose luminance is changed among the pixels constructing an image. Among the selected pixels, with respect to only a pixel w hose luminance is within the permissible alteration range, the luminance is changed to a specific value, thereby embedding information. As a result, a video signal in which electronic watermark information is embedded is obtained.

Reference numeral 7 denotes a copy generation management system (CGMS) signal generating circuit for generating a CGMS signal of two bits. This CGMS signal is added together with the video signal in which the electronic watermark information is embedded outputted from the information embedment processing circuit 5 and a chrominance signal outputted from a chrominance signal circuit 11 by an adding circuit 9 and resultant data is recorded in a recording medium (not shown) via an output circuit 12.

The luminance changing method in the information embedment processing circuit 5 will be described with reference to FIG. 2.

Figure 2:
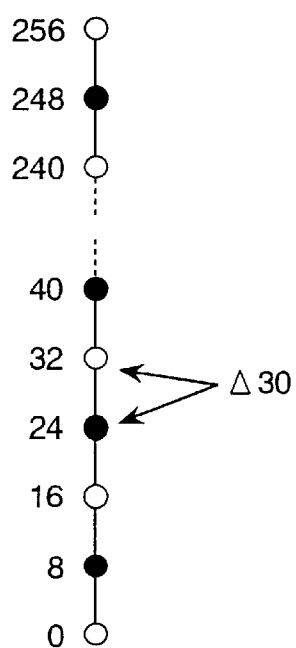
FIG. 2 is a schematic diagram in which brightness values of pixels are displayed in a straight line for explaining a method of embedding electronic watermark information.

FIG. 2 is a schematic diagram showing luminance values of pixels in a straight line. In the diagram, it is assumed that the value of the luminance of a single pixel ranges from 0 to 255. In the embodiment, a value of a blank circle on the straight line is luminance which corresponds to a multiple of 16 and corresponds to embedment information "0". A value of a painted circle corresponds to a value of (a multiple of 16+8) and corresponds to embedment information "1".

Fundamental operation of the information embedment processing circuit 5 will be first described. In order to obtain electronic watermark information, it is necessary to change the luminance corresponding to a pixel in an image to a nearest blank or painted circle. That is, when information desired to be embedded is "0", the luminance is changed to a blank circle. When information desired to be embedded is "1", the luminance is changed to a painted circle. For example, in the case where the luminance of a pixel is a value shown by Δ, that is, 30, when information desired to be embedded is "0", the luminance of the pixel is changed to 32 and when information desired to be embedded is "1", the luminance is changed to 24.

Utilization of a permissible alteration range calculating circuit 3 will be described. In case of embedding the electronic watermark information, there is a case such that the change in luminance of a pixel is too large and the image visually changes. In order to prevent this, it is necessary to set a permissible alteration range in which the value of a pixel can be changed. For example, in FIG. 2, when it is assumed that the value of the luminance Δ of the pixel is 30 and the permissible alteration range of the luminance of the pixel is 26 to 33. In this case, when information desired to be embedded is "0", there is no problem to change the luminance of the pixel to 32 according to the fundamental operation. When the information desired to be embedded is "1", however, since the luminance 24 to which the luminance is supposed to change is not included in the permissible alteration range, the luminance is changed to 26 which is the nearest to 24 in this case. Alternately, change in luminance of the pixel is given up and the luminance of a predetermined another pixel is changed.

A method of extracting electronic watermark information from a watermark inserted image, that is, a video signal in which the electronic watermark information is embedded will be described. First, a pixel whose luminance value has been changed is selected. Since the position of the pixel whose luminance is changed is predetermined, the pixel can be selected by a pulse obtained on the basis of a horizontal sync signal. That is, the pixel whose luminance has been changed in accordance with the same rule as that of the pixel selection in the information embedment processing circuit 5 is selected.

The luminance signal is picked up from each of the selected pixels. Whether the value is closer to a multiple of 16 or (a multiple of 16+8), it is discriminated that the embedded information is either "0" or "1".

Since the information embedment processing circuit 5 changes the luminance within the permissible alteration range, there is a case that the luminance cannot be accurately changed to a multiple of 16 or (a multiple of 16+8). Consequently, an error occurs in extraction of information. However, the problem can be solved by overlappingly embedding the same information to a plurality of pixels and extracting the information by decision by majority.

An embodiment of a copy generation management signal will be described with reference to FIGS. 3A and 3B.

FIG. 3A is a schematic diagram showing an embodiment of a television signal in a vertical period in which the copy generation management signal is inserted. FIG. 3B is a partially enlarged diagram of FIG. 3A.

In FIG. 3A, copy generation management signals (abbreviated as CGMS signals) 31 and 35 are inserted in a period out of a scan range in an upper part of a picture plane in the seventeenth and eighteenth horizontal sync periods of a vertical sync signal 32. Consequently, the CGMS signals 31 and 35 do not usually appear on the picture plane. Reference numeral 33 denotes a video signal.

In FIG. 3B, the CGMS signal 31 is a signal of two bits comprising 31a and 31b. In the diagram, reference numeral 34 shows an area in which the video signal is arranged.

The television signals shown in FIGS. 3A and 3B are recorded into a recording medium such as optical disk or video tape.

The CGMS signal has to express three modes of (1) copy free, (2) copy-once-permission, and (3) copy inhibition.

In case of (2) of copy-once-permission mode, the signal has to be rewritten to (3) copy inhibition when the signal is copied. This operation is called updating of copy generation. 5 When the signal is copied in the (3) copy inhibition mode, the copying operation has to be inhibited. For this purpose, each of the CGMS signals 31 and 35 shown in FIGS. 3A and 3B is constructed by a control signal of two bits. An apparatus for processing electronic watermark and CGMS signal provided for a recording or reproducing apparatus for copying television signals is used to discriminate whether the CGMS signal can be reproduced or not.

The copy generation updating denotes that the CGMS signal is rewritten, for example, from bits "10" indicative of copy-once-permission to bits "11" indicative of copy inhibition.

The above-mentioned electronic watermark information includes not only original image reproducing or recording control information but also information clarifying the source of the image. The CGMS signal includes information such as copy free, copy-once-permission, and copy inhibition. In the following description, both of the information will be called copy control information.

We tend to think that it is sufficient to perform the copy control by using either a regular CGMS signal or electronic watermark information. In case of using one of the control signals, for example, only the CGMS signal, the signal can be easily rewritten. There is a case that a control different from a desired copy control is executed. In a state where the copy generation has to be updated, for example, when the copy generation of the CGMS signal is not updated though the signal has been copied once, the copy can be performed repeatedly in the mode of copy-once-permission.

Since the luminance of the luminance signal included in a video signal is changed in the electronic watermark information, it is difficult to update the copy generation of the electronic watermark information. For example, when the electronic watermark information shows the mode of copy-once-permission, it is difficult to change the generation of the signal. Consequently, the copy can be performed repeatedly. In this case, by updating the copy generation of the CGMS signal, the copy can be inhibited.

When a circuit for updating the electronic watermark information is used for a reproducing apparatus or a recording apparatus for copying, the copy generation of electronic watermark information can be updated. In this case, the copy inhibition or reproduction inhibition can be more clearly performed in this case.

When updating of the copy generation of the CGMS signal is neglected although the CGMS signal has to be updated, the contents of the electronic watermark information and those of the CGMS signal are the same. Consequently, such a state is detected and copy or reproduction can be inhibited.

In consideration of the cases, the copy control using both of the electronic watermark information and the CGMS signal has been considered.

The copy control using the electronic watermark information and the CGMS signal will be described hereinbelow by using a copy control information processing apparatus according to the invention shown in FIG. 4.

FIG. 4 is a block diagram showing an embodiment of the apparatus for processing a video signal having copy control information according to the invention.

In FIG. 4, a disk 40 is a recordable disk such as RAM disk or a read only disk such as ROM disk. In case of the recordable disk, a digital broadcast signal is recorded in the disk 40. It is assumed that electronic watermark information with copy-once-permission and a CGMS signal with copy-once-permission are recorded in the digital broadcast signal. In case of the read only disk, electronic watermark information with copy inhibition and a CGMS signal with copy inhibition are recorded. A video signal recorded in the disk 40 is picked up by an optical pickup 41 and read by a signal reading circuit 42, and the video signal is outputted from the read signal by a video signal processing circuit 43.

Generally, the signal read from the disk 40 has been MPEG processed. The MPEG process is cancelled by the signal reading circuit 42 and the MPEG compressed signal is expanded. That is, the MPEG processed signal is outputted at an output terminal 44 of. the signal reading circuit 42 and a signal in which the MPEG process is cancelled is outputted at a terminal 45. The signals at the terminals 44 and 45 are selected by a switch 46 and the selected signal is supplied to an electronic watermark detecting circuit 47 where the electronic watermark information is detected. In the circuit of FIG. 4, the switch 46 is provided to show that either the MPEG processed signal or the signal obtained by decoding the MPEG processed signal can be inputted to the electronic watermark detecting circuit 47. The electronic watermark detecting circuit 47 is generally connected to either the terminal 44 or 45.

The video signal is supplied from the video signal processing circuit 43 to a CGMS signal detecting circuit 48 and the CGMS signals 31a, 31b, and 35 recorded in the video signal are detected by the circuit 48.

The electronic watermark signal and the CGMS signal which are detected as mentioned above are supplied to an output control circuit 49. In the circuit 49, the two signals are compared and the rationality of them is checked. A display (not shown) for reproducing an image or a recording device (not shown) for recording the video signal picked up from an output terminal 50 is connected to the output terminal 50 of the video signal processing circuit 43. Reference numeral 51 indicates a motor for rotating the disk 40.

The contents of the check will be described hereinbelow.

When the disk 40 is a read only disk, copying of the recorded contents is, generally, not permitted. The electronic watermark information of the read only disk is therefore in the copy inhibition mode. Consequently, in such a case, an output control circuit 49 is controlled so that copying is inhibited by the electronic watermark information.

When the disk 40 is a read only disk and copying is permitted once, the CGMS signal is generation updated while being recorded from the output terminal 50 into the recording device (not shown). The operation will be described hereinafter by using another embodiment shown in FIG. 7.

In case of a recordable disk such as RAM disk, it can be considered that digital broadcast or the like is again copied from a recording medium in which the digital broadcast has been recorded primarily. In this case, the CGMS signal and electronic watermark information each permitting only-once-copying have been inserted in a general digital broadcast signal. The CGMS signal is supposed to be generation updated in the primary recording and the copy of the signal is supposed to be inhibited.

When the terminal 50 is connected to a display and a video signal is reproduced from the recordable disk, it is desired to inhibit reproduction when intentional alteration is performed to the reproduction or CGMS signal.

It is supposed that the electronic watermark information permitting only-once-copying is detected from the electronic watermark detecting circuit 47 and the generation updated CGMS signal, that is, the CGMS signal updated so as to inhibit copying is detected from the CGMS signal detecting circuit 48 on the reproducing apparatus side.

In this case, since the electronic watermark information permitting only-once-copying and the CGMS signal having the content of copy inhibition are inputted to the output control circuit 49, it is recognized that the electronic watermark information and the CGMS signal have a rational relation and a signal permitting reproduction is supplied to the video signal processing circuit 43. In case of recording data to a recordable disk, however, the electronic watermark information may be a signal indicative of only-once-copying permission of a signal in an original image but the CGMS signal has to be generation updated. Nevertheless, if the CGMS signal remains to permit only-once-copying, it is assumed that copying has been performed while the CGMS signal is not correctly updated upon recording.

In such a case, therefore, it is determined that the output control circuit 49 does not execute updating operation normally and the output of the circuit 49 is stopped.

In the case where the CGMS signal is not detected from the CGMS signal detecting circuit 48 even when the electronic watermark information is detected by the electronic watermark information detecting circuit 47, it is regarded that some illegal operation has been performed. A signal inhibiting reproduction is supplied from the output control circuit 49 to the video signal processing circuit 43 and the reproduction of the video signal is inhibited.

In case of recording a broadcast signal in which the electronic watermark information is copy inhibited and the CGMS signal is also copy inhibited into the recordable disk by a means, the electronic watermark information of copy inhibition and the CGMS signal of copy inhibition are supplied to the output control circuit 49. A signal inhibiting reproduction is consequently supplied from the circuit 49 to the video signal processing circuit 43, thereby inhibiting reproduction.

When both of the electronic watermark information and the CGMS signal are not detected, copying is not inhibited, so that a signal permitting reproduction is outputted from the output control terminal.

When reproduction of the video signal of the disk 40 is permitted, it can be considered to perform recording by transmitting the signal to the recording apparatus. In case of copy free, recording can be naturally performed. In other case, the CGMS signal is copy inhibited. By detecting the signal, copying is checked. For example, when the amplitude of the CGMS signal is set to the maximum, an AGC control circuit (not shown) is controlled so that the gain of an amplifier becomes the minimum by the signal. Consequently, since no signal is outputted, copying cannot be performed as a result.

When a video signal is reproduced on a display, it is sufficient to make the display generate an extract pulse for extracting the CGMS signal, thereby extracting the CGMS signal and setting so that a gain control circuit does not respond to the CGMS signal.

The output control circuit 49 performs a reproducing control by checking the updating result of the electronic watermark information and the CGMS signal.

Figure 5:
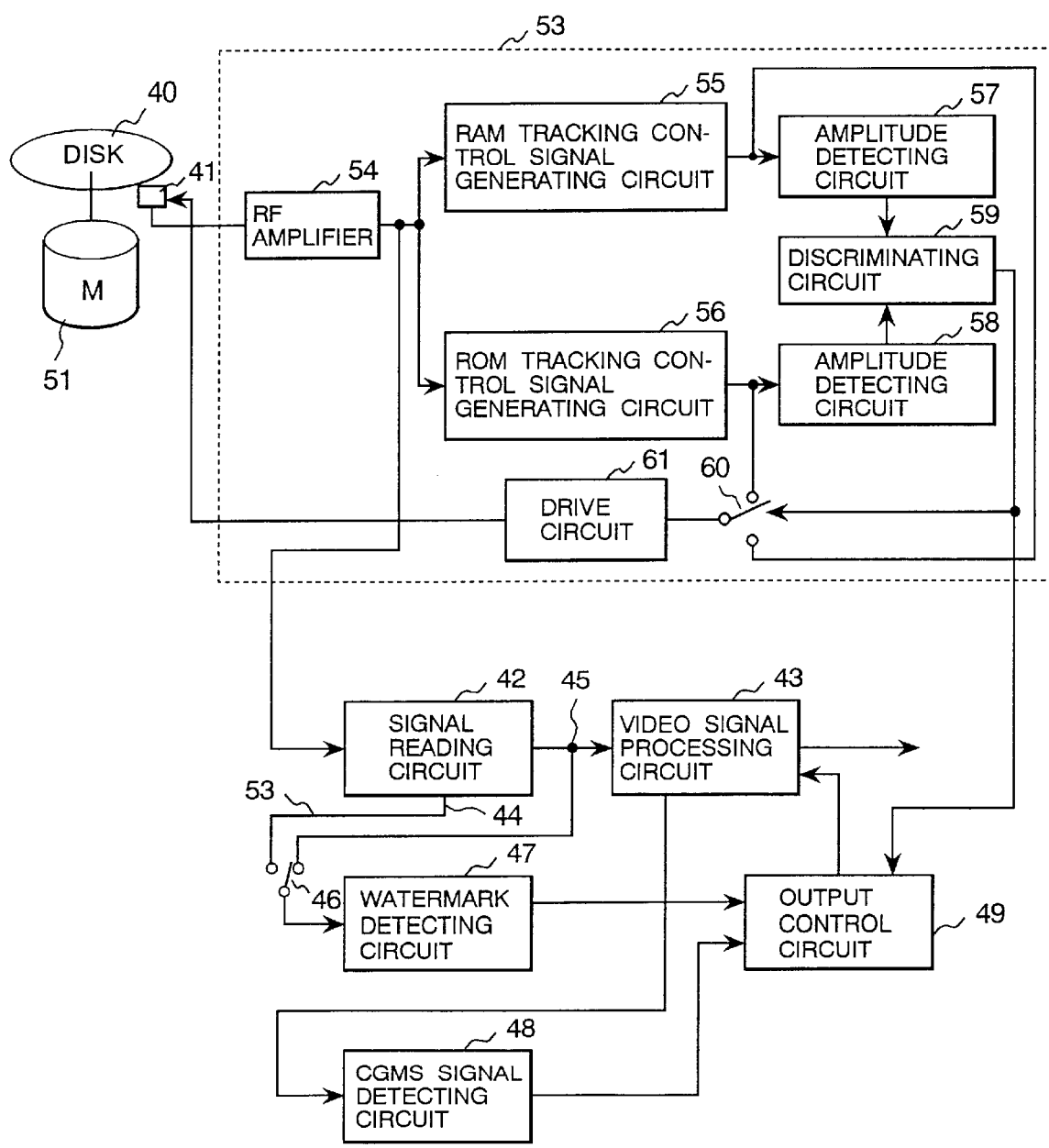
FIG. 5 is a block diagram showing another embodiment of the processing apparatus of the video signal having copy control information according to the invention.

FIG. 5 is a block diagram showing another embodiment of the copy control information processing apparatus according to the invention. In FIG. 5, blocks having the same functions as those in FIG. 4 are designated by the same reference numerals.

In FIG. 5, a disk kind discriminating circuit 53 for discriminating whether the disk 40 is a recordable RAM disk or a ROM disk is newly provided. The disk kind discriminating circuit 53 uses a tracking servo circuit provided for an optical disk apparatus. A reproduction signal taken from an RF amplifier 54 is supplied to a RAM tracking control signal generating circuit 55 and a ROM tracking control signal generating circuit 56. When an output of the circuit 55 is supplied to an amplitude detecting circuit 57 and an output of the circuit 56 is supplied to an amplitude detecting circuit 58, a signal having larger amplitude is extracted from the amplitude detecting circuit 57 or 58 corresponding to the kind of the disk 40 and a signal having smaller amplitude is extracted from an output of the amplitude detecting circuit which is not corresponding to the kind of the disk 40.

Consequently, a disk discrimination signal (for example, plus or minus signal) according to the kind of the disk 40 is extracted from an output of the discriminating circuit. The disk discrimination signal controls a switch 60, thereby connecting the terminal of either the RAM tracking control signal generating circuit 55 or ROM tracking control signal generating circuit 56 to a drive circuit 61. An output of the disk discriminating circuit 59 is also supplied to the output control circuit 49. The output control circuit 49 receives the result of disk discrimination. The discrimination result of the recordable medium and that of the read only medium are different. For example, in case of a RAM disk, there is a case such that the electronic watermark information can be recorded once and the CGMS signal can be also recorded once. In case of a RAM disk, however, since a digital broadcast signal or the like has been already recorded, generally, the electronic watermark information can be recorded once when the electronic watermark information is not changed and the CGMS signal is generation updated and copying is inhibited. When the CGMS signal can be recorded once, it can be assumed that some illegal operation has been performed as mentioned above. The ROM disk and the RAM disk have the same information, it is necessary to permit reproduction for the ROM disk and to inhibit reproduction for the RAM disk. By supplying the signal discriminating the kind of a disk to the output control circuit 49, the above can be prevented.

Figure 6:
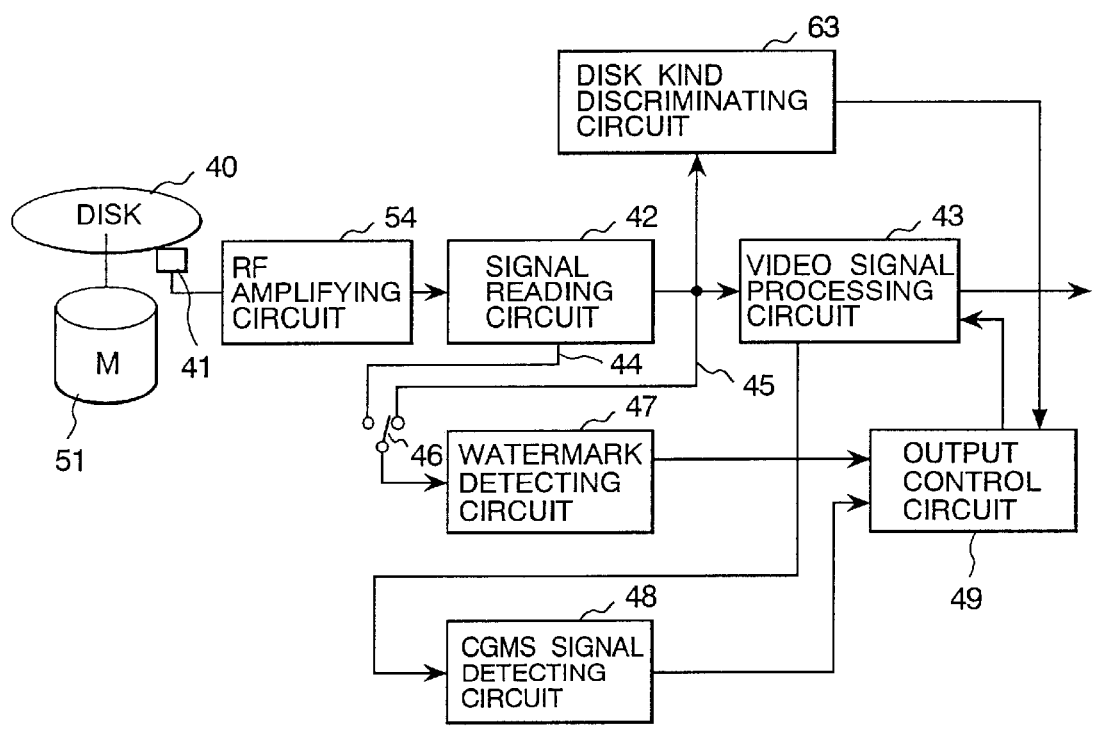
FIG. 6 is a block diagram showing further another embodiment of the processing apparatus of the video signal having copy control information according to the invention.

FIG. 6 is a block diagram showing further another embodiment of the apparatus for processing the video signal having copy control information according to the invention. In FIG. 6, reference numeral 63 denotes a disk kind discriminating circuit. The signal indicative of the kind of disk recorded in the disk 40 is supplied via the signal reading circuit 42 to the disk kind discriminating circuit 63. The signal indicative of the kind of the disk 40 obtained from an output of the disk kind discriminating circuit 63 is supplied to the output control circuit 49. As described by using FIG. 5, the control contents of the output control circuit 49 are changed according to the kind of the disk 40 as described with reference to FIG. 5.

The construction and operation of a circuit when a signal reproduced from a reproducing player is recorded to a recording disk will be described hereinbelow with reference to FIG. 7.

Figure 7:
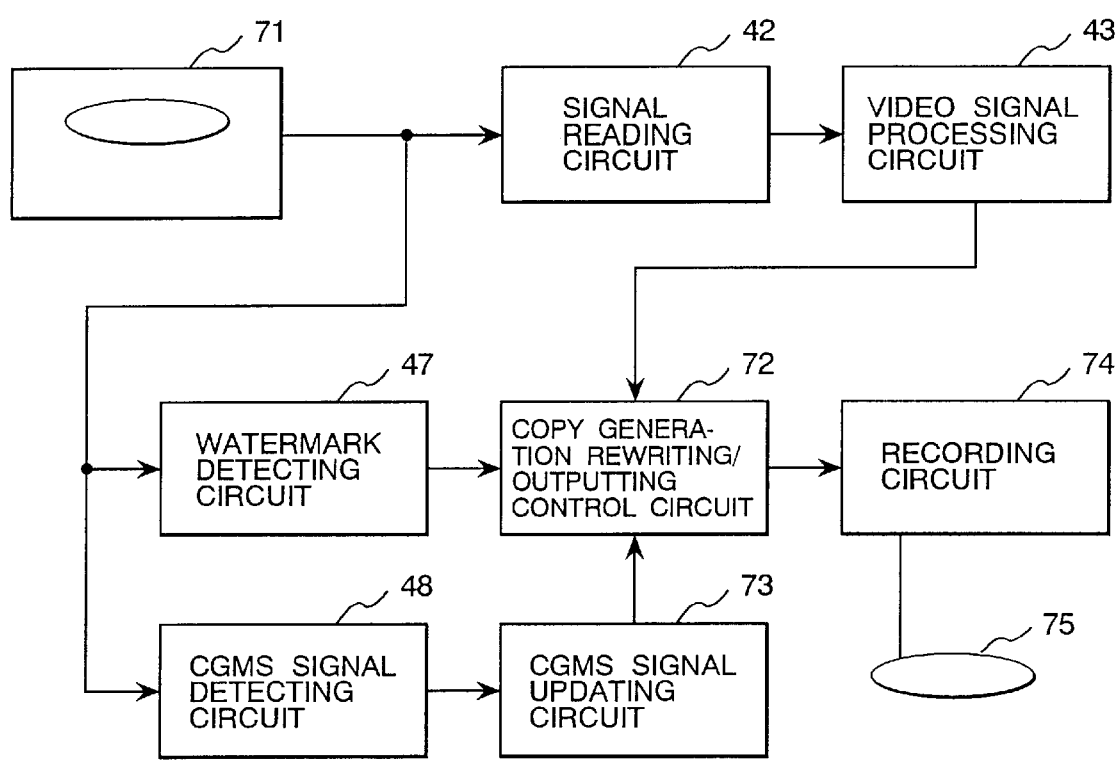
FIG. 7 is a block diagram showing further another embodiment of the processing apparatus of the video signal having copy control information according to the invention.

FIG. 7 shows further another embodiment of the apparatus for processing a video signal having copy control information according to the invention. In the diagram, reference numeral 71 denotes a reproducing player. The electronic watermark information included in a signal reproduced by the reproducing player 71 is detected by the electronic watermark detecting circuit 47 and is supplied to a copy generation rewriting and outputting control circuit 72 for rewriting the copy generation of the CGMS signal or the electronic watermark information and the CGMS signal in the reproduction signal. The CGMS signal included in the reproduction signal is detected by the CGMS signal detecting circuit 48 and supplied to a CGMS signal updating circuit 73. The detected CGMS signal is updated in conformity with a predetermined rule.

According to the predetermined rule, if a detected signal is a copy-once-permitted signal, the signal is converted to a copy inhibition signal. If the detected signal is a copy free signal, the signal is not changed. If it is a copy inhibition signal, the operation of the recording circuit is stopped.

A generation updated CGMS signal outputted from the CGMS signal updating circuit 73 is supplied to the copy generation rewriting and outputting control circuit 72. The video signal has been supplied to the copy generation rewriting and outputting control circuit 72 via the signal reading circuit 42 and the video signal processing circuit 43. The generation updated CGMS signal or the CGMS signal and the electronic watermark information is rewritten by the copy generation rewriting and outputting control circuit 72 and then recorded onto a recordable disk 75 such as a RAM disk via a recording circuit 74 constructed by a modulation circuit or the like. The copy generation rewriting and outputting control circuit 72 checks whether the contents of the electronic watermark information and the generation updated CGMS signal are rational or not.

The CGMS signal is generation updated by changing a two-bit signal shown by the CGMS signals 31a and 31b in FIG. 3 from "10" to "11". When the contents of the electronic watermark information and the CGMS signal outputted from the CGMS signal updating circuit 73 are not rational in the copy generation rewriting and outputting control circuit 72, the recording operation is stopped.

For example, when the electronic watermark information is copy inhibited and the CGMS signal is also copy inhibited, no video signal is outputted from the copy generation rewriting and outputting control circuit 72. When the electronic watermark information is copy permitted and the CGMS signal is also copy permitted, a video signal is outputted from the copy generation rewriting and outputting control circuit 72 and is recorded onto the disk 75.

When the electronic watermark information is copy-once-permitted and the CGMS signal has been rewritten from copy-once-permission to copy inhibition, a video signal is outputted from the copy generation rewriting and outputting control circuit 72 and is recorded onto the disk 75.

When the electronic watermark information has been rewritten from copy-once-permission to copy inhibition and the CGMS signal has been rewritten from copy-once-permission to copy inhibition, a video signal is outputted from the copy generation rewriting and outputting control circuit 72 and the recording operation to the disk 75 is continued.

Assuming that the case where the generation updated CGMS signal is rewritten from copy-once-permission to copy inhibition though the electronic watermark information inhibits copying. The CGMS signal is newly recorded to a disk which is inherently copy inhibited and the signal is copy once permitted.

When a signal form which should not be inherently used is detected, it is discriminated by the copy generation rewriting and outputting control circuit 72 that there is no rationality between the two signals and the circuit 72 does not output the video signal.

Figure 8:
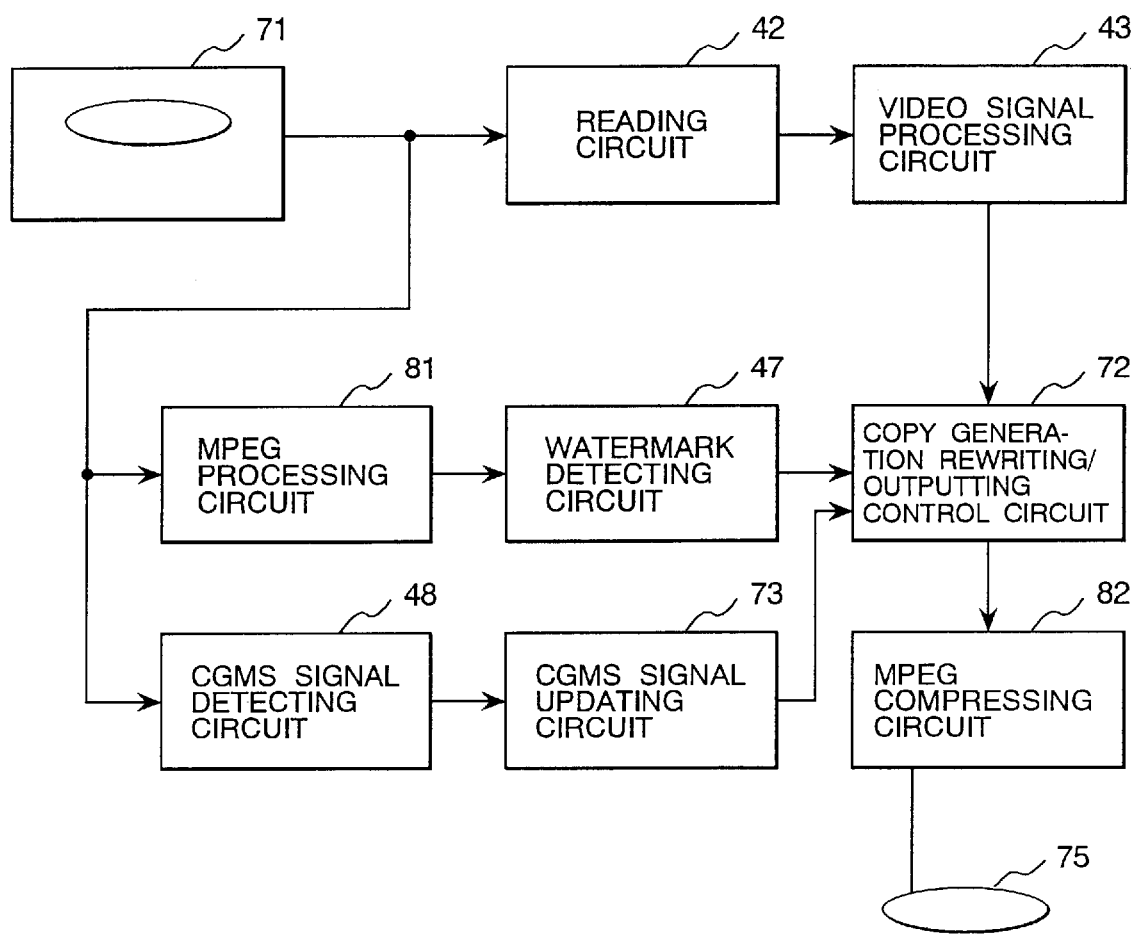
FIG. 8 is a block diagram showing further another embodiment of the processing apparatus of the video signal having copy control information according to the invention.

FIG. 8 is a block diagram showing further another embodiment of the apparatus for processing the video signal having copy control information according to the invention. In the block diagram of FIG. 7, a compressed signal which is not MPEG decoded is supplied to the electronic watermark detecting circuit 47 and the CGMS signal detecting circuit 48. In the block diagram of FIG. 8, an MPEG processing circuit 81 is provided and a signal obtained by decoding the MPEG compressed signal is supplied to the electronic watermark detecting circuit 47. The case of recording data onto the disk 75 is different with respect to a point such that the signal is again MPEG compressed by an MPEG compression circuit 82. However, since other points are the same, the description is omitted here.

As described, there are two cases; the case where the electronic watermark information and the CGMS signal are detected in the MPEG compressed signal, and the case where the electronic watermark information and the CGMS signal are detected by using the video signal in which the MPEG compression process is cancelled. The detection of the electronic watermark information and the process of the CGMS signal can be performed by either signal.

As mentioned above, according to the invention, the reproduction or recording is permitted when the electronic watermark information recorded in an image by changing the luminance signal of the video signal and the CGMS signal inserted into the video signal have the rational relation, thereby enabling copy control with more certainty as compared with a case where single information is used to be performed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of reproducing a video signal having copy control information for reproducing electronic watermark information and a Copy Generation Management System (CGMS) signal from a video signal including said electronic watermark information which copy control information is embedded by changing a luminance value of a luminance signal and a CGMS signal having copy control information inserted into a region out of a scan region of the video signal in order to control outputting of the video signal, the method comprising the steps of:

detecting said electronic watermark information;

detecting said CGMS signal; and stopping outputting of said video signal when the copy control information obtained from said electronic watermark information and the copy control information obtained from said CGMS signal lacks a rational relation to each other.

2. A method according to claim 1, wherein each of said electronic watermark signal and said CGMS signal has either copy inhibition information or copy-once permission information.

3. A method according to claim 2, further comprising a step of outputting and displaying said video signal by the copy-once permission information obtained from said electronic watermark information and the copy inhibition information obtained from said CGMS signal.

4. A method according to claim 2, further comprising a step of outputting and displaying said video signal by copy inhibition information obtained from said electronic watermark information and copy inhibition information obtained from said CGMS signal.

5. A method according to claim 1, wherein when said CGMS signal is not reproduced, outputting of said video signal is stopped.

6. A method of reproducing a video signal having copy control information for reproducing, from a disk, electronic watermark information and a Copy Generation Management System (CGMS) signal from a video signal including said electronic watermark information in which information of either copy inhibition or copy-once permission is embedded by changing a luminance value of a luminance signal and the CGMS signal which is inserted into a region output of a scan region of the video signal and has information of either copy inhibition or copy-once permission in order to control outputting said video signal, comprising the steps of:
- detecting said electronic watermark information;
- detecting said CGMS signal;
- discriminating the kind of said disk; and
- stopping outputting of said video signal when the copy control information obtained from said electronic watermark information and the copy control information obtained from said CGMS signal lacks a rational relation to each other.

7. A method according to claim 6, further comprising a step of outputting said video signal when said disk is a read only disk, said electronic watermark information is a signal of copy-once-permission, and said CGMS signal is a signal of record-once-permission.

8. A method according to claim 6, further comprising a step of stopping the outputting of said video signal when said disk is a recordable disk, said electronic watermark information is a signal of copy-once-permission, and said CGMS signal is a signal of record-once-permission.

9. A method of reproducing a video signal having copy control information for reproducing, from a recording medium, electronic watermark information and a Copy Generation Management System (CGMS) signal from a video signal including said electronic watermark information in which information of either copy inhibition or copy-once permission is embedded by changing a luminance value of a luminance signal and the CGMS signal which is inserted into a region out of a scan region of the video signal and has information of either copy inhibition or copy-once-permission in order to control outputting of said video signal, the method comprising the steps of:
- detecting copy control information embedded in said electronic watermark information;
- detecting the copy control information from said CGMS signal;
- discriminating whether the copy information embedded in said electronic watermark information and that in the CGMS signal has a rational relation to each other or not; and
- permitting recording of said video signal only when the relation is rational to each other.

10. A reproduction method according to claim 9, wherein the step for discriminating said rational relation discriminates the relation as rational from a state where copy-once-permission information obtained from said electronic watermark information and copy-once-permission information obtained from said CGMS signal is rewritten to copy inhibition information.

11. A method according to claim 9, wherein the step of discriminating said rational relation discriminates the relation as rational from a state where copy-once-permission information obtained from said electronic watermark information is rewritten to copy inhibition information and copy-once-permission information obtained from said CGMS signal is rewritten to copy inhibition information.

12. An apparatus for processing a video signal having copy control information for reproducing from a recording medium electronic watermark information and a Copy Generation Management System (CGMS) signal from a video signal including said electronic watermark information in which copy control information is embedded by changing a luminance value of a luminance signal and the CGMS signal having copy control information inserted into a region out of a scan region of the video signal in order to control outputting of the video signal, the apparatus comprising:
- a circuit for processing said video signal reproduced from said recording medium;
- an electronic watermark detecting circuit;
- a CGMS signal detecting circuit for detecting said CGMS signal; and
- an output control circuit for controlling said video signal processing circuit and stopping outputting of said video signal when said electronic watermark information and said CGMS signal lack a rational relation to each other.

13. An apparatus for processing a video signal having copy control information for reproducing from a recording medium electronic watermark information and a Copy Generation Management System (CGMS) signal from a video signal which includes said electronic watermark information in which information of copy inhibition or copy-once-permission is embedded by changing a luminance value of a luminance signal an the CGMS signal which is inserted in a region out of a scan region of the video signal and has information of either copy inhibition or copy-once-permission in order to control outputting of the video signal, the apparatus comprising:
- a video signal processing circuit for processing said video signal read from said recording medium;
- an electronic watermark information detecting circuit for detecting said electronic watermark information;
- a CGMS signal detecting circuit for detecting said CGMS signal; and
- an output control circuit for receiving said electronic watermark information from said electronic watermark information detecting circuit and said CGMS signal from said CGMS signal detecting circuit and on/off controlling the outputting of the video signal of said video signal processing circuit according to whether said electronic watermark information and said CGMS signal have a rational relation to each other or not.

14. An apparatus according to claim 13, wherein said output control circuit controls said video signal processing circuit so as to output a video signal by copy-once-permission information obtained from said electronic watermark information and copy inhibition information obtained from said CGMS signal.

15. An apparatus according to claim 13, wherein said output control circuit controls said video signal processing circuit so as to output said video signal by copy inhibition information obtained from said electronic watermark information and copy inhibition information obtained from said CGMS signal.

16. An apparatus according to claim 13, wherein said output control circuit controls said video signal processing circuit so as not to output said video signal when said CGMS signal is not detected.

17. An apparatus according to claim 13, wherein when said recording medium is a recordable medium, said output control circuit controls said video signal processing circuit so as not to output said video signal by copy-once-permission information obtained from said electronic watermark information and copy-once-permission information obtained from said CGMS signal.

18. An apparatus according to claim 13, wherein when said recording medium is a read only medium, said output control circuit controls said video signal processing circuit so as to output said video signal by copy-once-permission information obtained from said electronic watermark information and copy-once-permission information obtained from said CGMS signal.

19. An apparatus for processing a video signal having copy control information for reproducing from a recording medium electronic watermark information and a Copy Generation Management System (CGMS) signal from a video signal which includes said electronic watermark information in which copy control information is embedded by changing a luminance value of a luminance signal and said CGMS signal having copy control information inserted into a region out of a scan region of the video signal in order to control outputting of said video signal, comprising:

a circuit for processing said video signal reproduced from said recording medium;

an electronic watermark information detecting circuit for detecting said electronic watermark information;

a CGMS signal detecting circuit for detecting said CGMS signal;

an output control circuit for controlling said video signal processing circuit and stopping outputting of said video signal when said detected electronic watermark information and said detected CGMS signal lack a rational relation to each other; and a circuit for discriminating the kind of a disk.

20. An apparatus according to claim 19, wherein when an output of said disk kind discriminating circuit is a signal indicative of a recordable disk, said output control circuit controls said video signal processing circuit so as not to output said video signal by copy-once-permission information obtained from said electronic watermark information and copy-once-permission information obtained from said CGMS signal.

21. An apparatus according to claim 19, wherein when an output of said disk kind discriminating circuit is a signal indicative of a read only disk, said output control circuit controls said video signal processing circuit so as to output said video signal by copy-once-permission information obtained from said electronic watermark information and copy-once-permission information obtained from said CGMS signal.

22. An apparatus for processing a video signal having copy control information for reproducing from a recording medium electronic watermark information and a Copy Generation Management System (CGMS) signal from a video signal which includes said electronic watermark information in which information of either copy inhibition or copy-once-permission is embedded by changing a luminance value of a luminance signal and said CGMS signal which is inserted into a region out of a scan region of the video signal in order to control outputting of the video signal, the apparatus comprising:

a processing circuit for processing said video signal read from said recording medium;

a circuit for detecting said electronic watermark information;

a circuit for detecting said CGMS signal;

a circuit for updating the generation of said detected CGMS signal; and a rewriting and controlling circuit to which outputs of said electronic watermark information detecting circuit, said copy generation updating circuit, and said video signal processing circuit are supplied, rewrites the copy generation, and controls outputting of said video signal, wherein outputting of said video signal is allowed when said electronic watermark signal and said CGMS signal have a rational relation to each other, and outputting of said video signal is prohibited when said electronic watermark signal and said CGMS signal lack a rational ration to each other.

23. An apparatus according to claim 22, wherein said rewriting and controlling circuit allows said video signal to be outputted from said rewriting and controlling circuit by copy-once-permission information derived from said electronic watermark information and copy-once-permission information derived from said CGMS signal and allows the copy-once-permission information of said CGMS signal to be rewritten to copy inhibition information.

24. An apparatus according to claim 22, wherein said rewriting and controlling circuit allows said video signal to be outputted from said rewriting and controlling circuit by copy-once-permission information derived from said electronic watermark information and copy-once-permission information derived from said CGMS signal and allows the copy-once-permission information obtained from said electronic watermark information to be rewritten to copy inhibition and the copy-once-permission information of said CGMS signal to copy inhibition information.

25. A recording and reproducing apparatus comprising:

means for comparing a signal generated by a bit generating means directly detected when a video signal is reproduced with a detected signal from electronic watermark information embedded in said video signal and outputting the video signal only when the signals have a rational relation to each other in order to process said video signal having copy control information formed by said bit generating means for copy control; and means for embedding a control signal as electronic watermark information generated by said bit generating means.

26. An apparatus according to claim 25, further comprising:

means for detecting said electronic watermark information and changing the signal generated by said bit generating means only when the directly detected signal generated by said bit generating means shows copy-once-permission; and means for simultaneously recording said changed signal, said inputted electronic watermark recording signal and an image signal and inhibiting recording after that.

27. An apparatus according to claim 26, wherein only when the signal generated by said bit generating means shows copy-once-permission, the signal is rewritten to a signal of recording inhibition, and the rewritten signal is simultaneously recorded with said inputted electronic watermark recording signal and said video signal.

28. A reproducing apparatus for reproducing a video signal from a disk on which a video signal in which electronic watermark information is recorded and bit generating means for copy control are written, comprising:

electronic watermark information detecting means;

means for detecting a signal recorded by the bit generating means;

disk discriminating means for discriminating said disk; and means for reproducing said video signal written in said disk when said disk is discriminated as read only disk by said disk discriminating means and said electronic watermark information and the information generated by said bit generating means coincide with each other.

29. A reproducing apparatus for reproducing a video signal from a disk on which a video signal in which electronic watermark information is recorded and bit generating means for copy control are written, comprising:
- electronic watermark information detecting means;
- means for detecting a signal recorded by the bit generating means;
- disk discriminating means for discriminating said disk; and
- means for reproducing said video signal when said disk is discriminated as a recordable and reproducible disk by said disk discriminating means, said electronic watermark information and said bit generating means coincide with each other, and copy-once-permission of the signal generated by said bit generating means is correctly changed.

30. An apparatus according to claim 29, further comprising means for performing reproduction only when said disk is recordable and reproducible, said electronic watermark information is one generation copy permitted information, and information of said bit generating means is copy inhibition.

31. An apparatus according to claim 29, wherein said bit generating means is multiplexed on said video signal.

* * * * *